United States Patent [19]
Cummings

[11] Patent Number: 5,908,990
[45] Date of Patent: Jun. 1, 1999

[54] APPARATUS FOR MEASURING THE VELOCITY OF A FLUID FLOWING IN A CONDUIT

[75] Inventor: Derek Philip Cummings, Bangor, Ireland

[73] Assignee: Aura Enviromental, Ltd., County Down, Ireland

[21] Appl. No.: 08/844,324

[22] Filed: Apr. 18, 1997

[30] Foreign Application Priority Data

Apr. 19, 1996 [IE] Ireland ..................................... 960304

[51] Int. Cl.$^6$ ........................................................ G01F 1/32
[52] U.S. Cl. ..................................... 73/861.22; 73/861.42
[58] Field of Search ........................... 73/861.21, 861.22, 73/861.42, 861.52

[56] References Cited

U.S. PATENT DOCUMENTS

| | | | |
|---|---|---|---|
| 4,350,047 | 9/1982 | Fisher ................................... | 73/861.22 |
| 4,730,500 | 3/1988 | Hughes ................................. | 73/861.22 |
| 4,831,883 | 5/1989 | Kamenster ............................ | 73/861.22 |
| 4,977,781 | 12/1990 | Misumi et al. ....................... | 73/861.22 |
| 4,984,470 | 1/1991 | Hayward et al. ..................... | 73/861.22 |
| 5,052,229 | 10/1991 | Tanimura et al. .................... | 73/861.22 |
| 5,247,838 | 9/1993 | Vander Heyden et al. .......... | 73/861.22 |

Primary Examiner—Harshad Patel
Attorney, Agent, or Firm—Woodcock, Washburn Kurtz Mackiewicz & Norris, LLP

[57] ABSTRACT

An apparatus for measuring the velocity of a fluid flowing in a conduit 13 comprises a differential pressure generator including first and second bluff bodies 6a, 6b which are positioned in the conduit to create a differential pressure that is a function of the velocity of the fluid. First and second pressure sampling apertures 4a', 4b' are located downstream of the first and second bluff bodies respectively, and a differential pressure sensor 9a provides an electrical signal which is a function of the difference between the pressures at the apertures.

10 Claims, 7 Drawing Sheets

FIG. 1

(PRIOR ART)

APPARATUS FOR MEASURING THE VELOCITY OF A FLUID FLOWING IN A CONDUIT

This invention relates to an apparatus for measuring the velocity of a fluid flowing in a conduit. Although not limited thereto, the invention may be used to monitor and control systems or processes where particulate matter is conveyed in a gaseous transport medium.

According to the present invention there is provided an apparatus for measuring the velocity of a fluid flowing in a conduit, comprising a differential pressure generator including first and second bluff bodies which are positioned in the conduit to create a differential pressure that is a function of the velocity of the fluid, first and second pressure sampling apertures which are located downstream of the first and second bluff bodies respectively, and a differential pressure sensor for providing an electrical signal which is a function of the difference between the pressures at the apertures.

Figure 1:
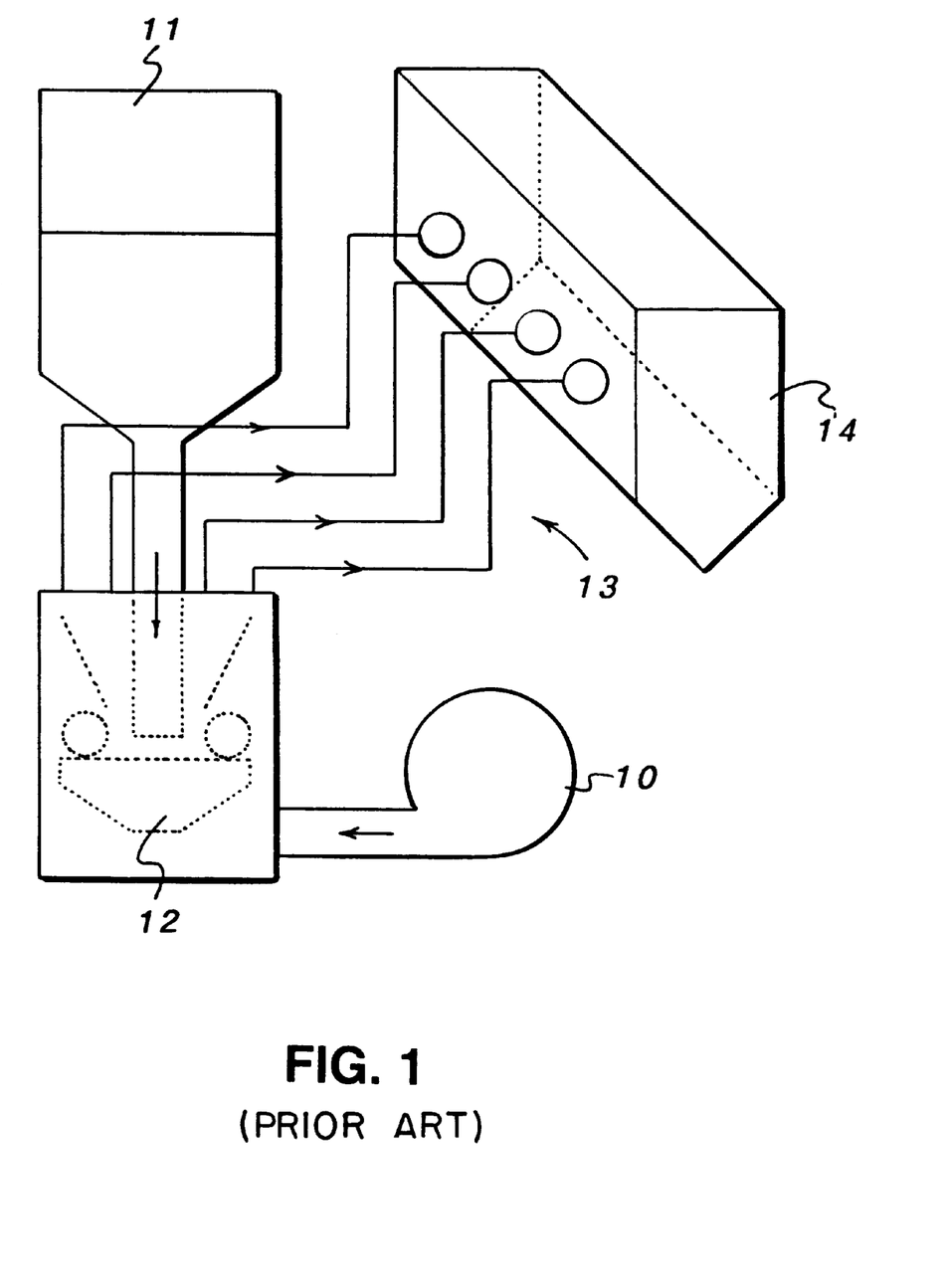
FIG. 1, previously described, is a schematic diagram of a prior art pulverised coal fired burner.

A typical application for the invention is shown in FIG. 1, which is a schematic diagram of a pulverised coal fired boiler. The transport medium 10 (hot primary air) and the substance 11 being conveyed (coal) are fed into a pulveriser 12 where the coal is ground into a fine powder. The two-phase mixture of primary air and pulverised coal then travels along conduits 13 (burner lines or pipes) to a receiving vessel 14, in this case a furnace.

The two-phase flow mixture is not in a homogeneous state which makes it very difficult to measure accurately and therefore to ensure the desired mass flows and coal/air ratios to each burner. Ensuring that the proper distribution of the two-phase mixture ends up in each burner pipe is a fundamental condition for optimum combustion, that is, no slag build-up problems, efficient thermal conversion as well as minimum carbon-in-ash and NOx emissions. Therefore, providing the ability to measure and continuously monitor the state of the two-phase mixture would facilitate achieving and sustaining the desired distribution through the burner pipes.

Accordingly, in a preferred application of the invention, a system for monitoring and controlling an arrangement in which a particulate material is transported through a conduit entrained in a fluid comprises an apparatus according to the invention positioned relative to the conduit such that the bluff bodies are located in a region of the conduit at least generally free of particulate material, a further apparatus for producing a further electrical signal which is a function of the difference between the pressures at relatively widely spaced locations along the conduit, and means for automatically controlling at least one flow parameter as a function of the first and further electrical signals.

An embodiment of the invention will now be described, by way of example, with reference to the accompanying drawings, in which:

FIG. 4A-A and FIG. 4B-B are views taken on lines 4A-A and :4B-B, respectively, of FIG. 4A.

Figure 2:
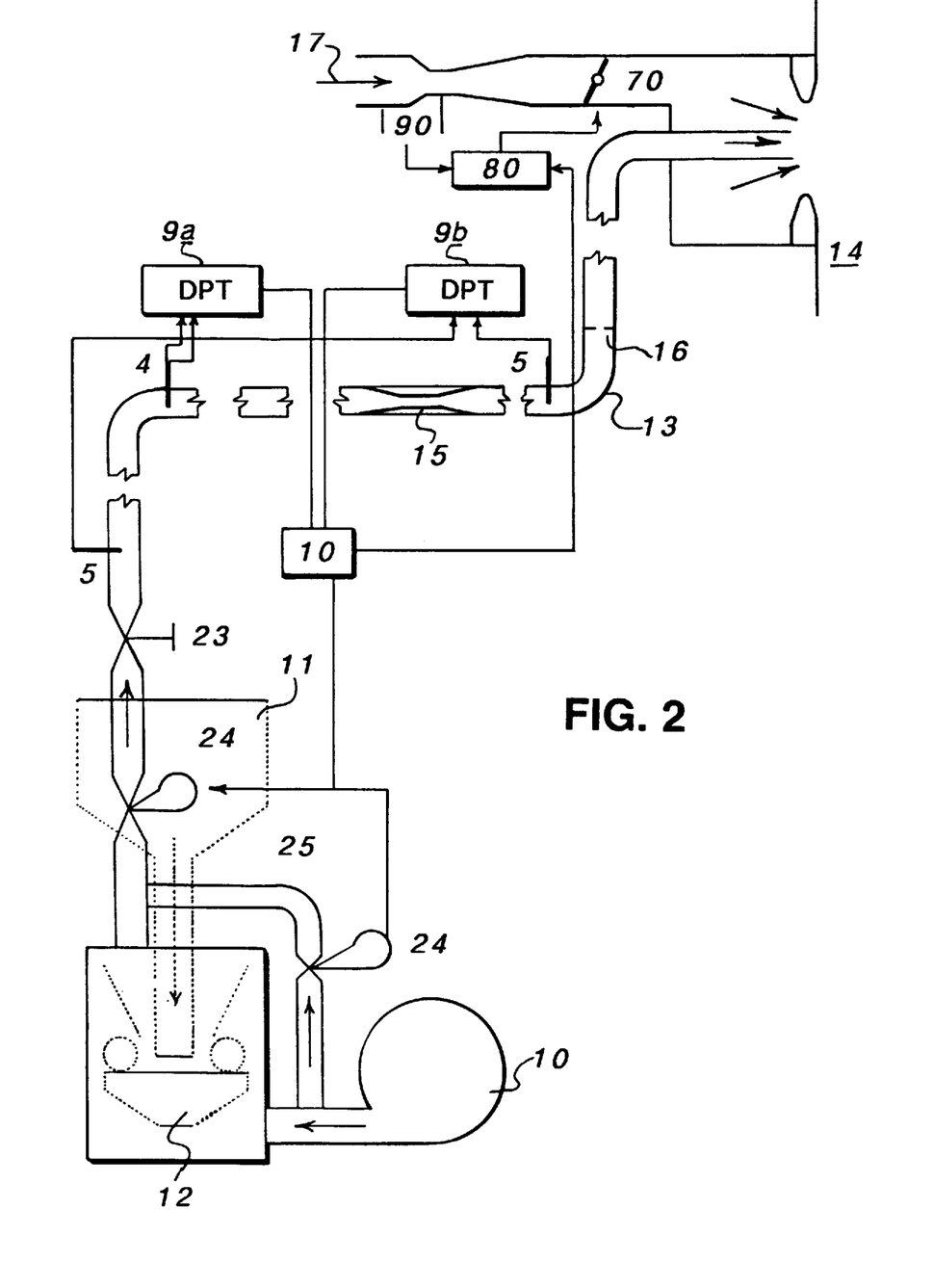
FIG. 2 is a schematic diagram of a pulverised coal fired burner which includes an embodiment of the present invention for monitoring and controlling the flow of pulverised coal to the furnace.

FIG. 2 shows a pulverised coal fired burner which includes an embodiment of the invention. As described in relation to FIG. 1, hot primary air 10 and coal 11 are fed into a pulveriser 12 where the coal is ground into a fine powder. The two-phase mixture of primary air and pulverised coal then travels along conduits (burner lines or pipes) 13 to a furnace 14. Only one conduit 13 is shown in FIG. 2, but there are a number of such conduits extending in parallel between the pulveriser 12 and the furnace 14, as indicated in FIG. 1. The conduits 13 can also extend from Me pulveriser 12 in one or more common conduits and ten split into two or more single conduits to each of the burners at the furnace 14. Furthermore, the conduits can be routed in a convoluted and/or non-parallel arrangement.

In order to monitor and control the flow of pulverised coal along the conduits 13, the system shown in FIG. 2 uses two different and independent differential pressure signals derived respectively from the flow of the transport medium (air) and the substance (pulverised coal) being conveyed through the conduits. In general the average density of the two phase mixture is constant as it passes along each conduit 13. However, the actual spatial density can vary from as low as the density of the transport medium to as high as the density of the substance being conveyed. Heretofore this has made measurement of the mixture very difficult.

in the system of FIG. 2 the non-homogeneous nature of the two-phase mixture is used to generate a differential pressure signal from the transport medium, by taking advantage of the "roping effect" of the substance. Roping effect is a common term used by those familiar with the art and refers to the impact of gravitational, frictional or centrifugal forces on the substance being conveyed along the conduit. These forces act on the substance much more so than on the transport medium. This causes the mixture to behave in a stratified manner, such that the substance travels in a concentrated manner around the outside of corner of bends, towards the bottom of horizontal pipe runs and is unstable in vertical runs of pipe.

The transport medium is not affected by the gravitational and centrifugal forces to the same extent as the substance being transported. Therefore, at certain locations in the conduits there is a distinct lack of substance being transported (i.e. severe stratification). At these locations a differential pressure signal representing the average velocity of the transport medium can be obtained without significant interference or effect from the substance being conveyed. This differential pressure signal is referred to herein as a DPV signal and is measured using a DPV generator whose construction will be described with reference to FIGS. 4, 4a and 4b with an alternative construction shown in FIG. 4c.

Figure 3A:
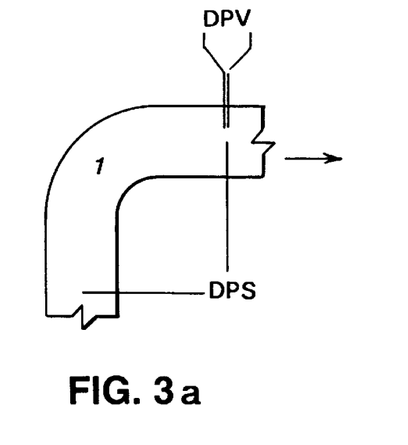
FIGS. 3a to 3f show typical locations for the DPV (differential pressure velocity) generator and the DPS (differential pressure static) generator shown in FIG. 2.
Figure 3B:
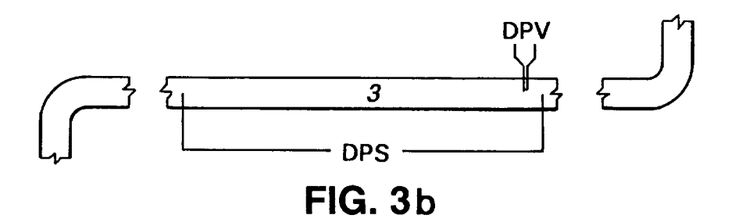
Figure 3C:
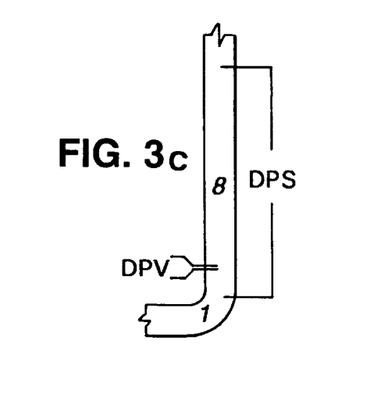
Figure 3D:
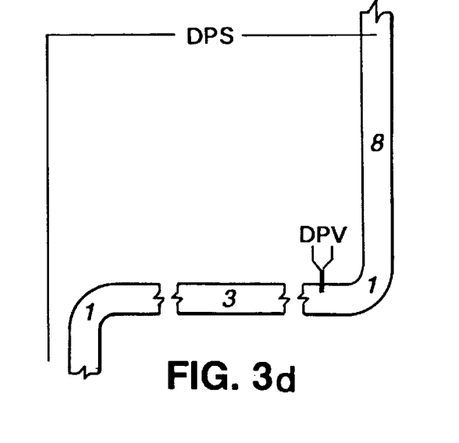
Figure 3E:
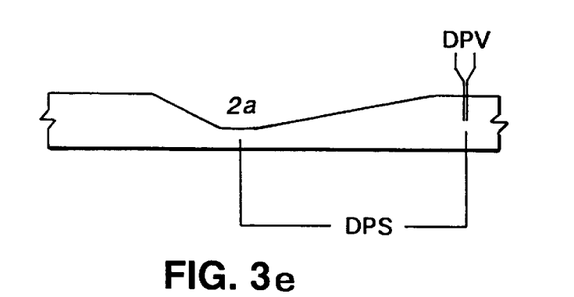
Figure 3F:
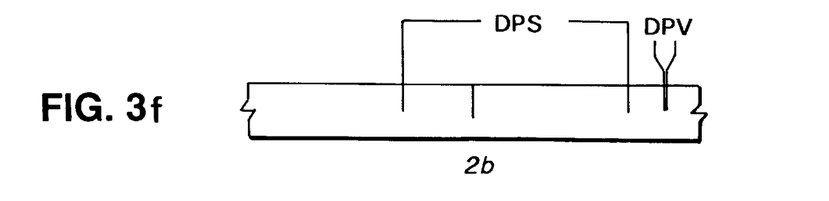

Typical locations in the conduits where the substance being conveyed is not present in significant quantities compared to the average composite density are shown in FIGS. 3a to 3f and include:

immediately after a change of direction in the 2-phase flow such as at an elbow 1 (FIGS. 3a, 3c and 3d),
at the end of a long horizontal section 3 (FIG. 3b), after an asymmetric venturi 2a (FIG. 3e), or after an asymmetric orifice plate 2b (FIG. 3f).

Therefore, in the system shown in FIG. 2 a respective, DPV generator 4 (FIG. 4) is inserted into each conduit 13 at a location where the substance being conveyed is not present in significant quantities, such as one of the locations identified above, and from the differential pressure thus measured the velocity and hence the mass flow rate of the transport medium can be calculated, as will be described. As seen in FIG. 2, for the actual conduit 13 shown, the DPV generator 4 is located just after an elbow.

Figure 4:
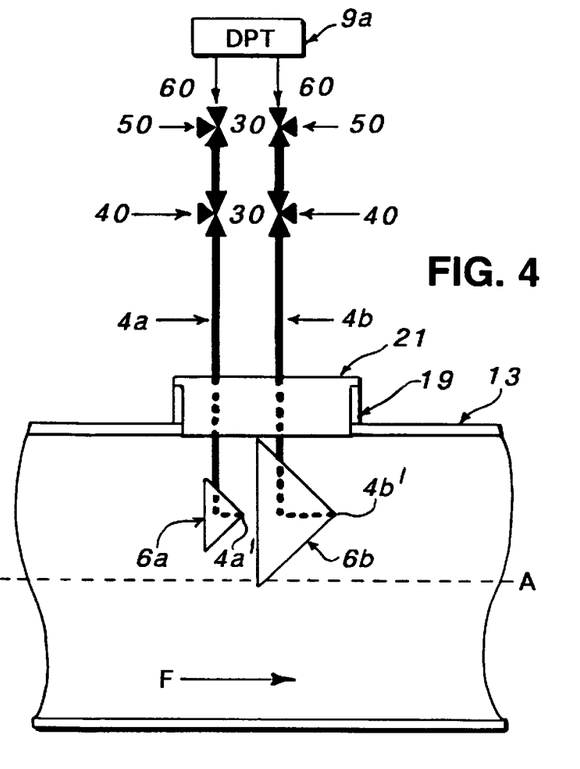
FIG. 4 is a cross-sectional view of the DPV generator shown in FIG. 2 looking across the width of the conduit as well as a schematic of the purge and calibration systems.
Figure 4A:
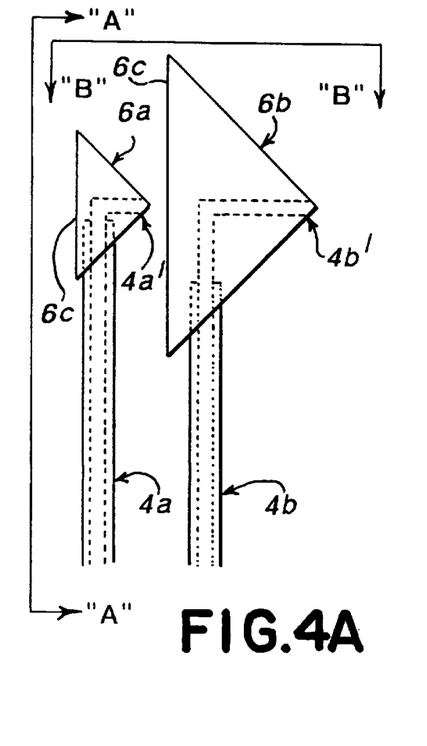
FIG. 4A is a side view of the tip of the DPV generator of FIG. 4 looking perpendicular to the axis of the conduit

Referring now to FIGS. 4 and 4A, each DPV generator 4 comprises a pair of pressure sampling tubes 4a and 4b respectively which are generally of circular cross section and extend side by side into the conduit 13 from one side thereof, preferably in a direction perpendicular to the axis A of the conduit 13 at the point concerned. The tubes 4a and 4b can be made from 1 mm thick by 6 mm diameter stainless steel and they may be protected by erosion resistant material such as ceramic, abrasion resistant steel or rubber. The ends of the tubes 4a and 4b terminate in upstream and downstream bluff bodies in the form of respective cones 6a and 6b. The cones 6a and 6b are arranged at least approximately on a common axis parallel to the axis A of the conduit and have broad upstream-facing surfaces 6c arranged at least approximately normal to the axis A. The internal cavities of the tubes 4a and 4b are continued flrough the cones 6a and 6b to emerge at apertures 4a' and 4b' at the downstream ends (apexes) of the cones 6a and 6b respectively.

Although in FIGS. 4 and 4A each bluff body is in the form of a cone, bluff bodies of other regular or irregular shapes can be used, such as a cylinder, pyramid or wedge, and it is also not necessary for the body to have a broad upstream face perpendicular to the direction of flow. All that is necessary is that each body should create a wake providing a change in pressure and the bodies should be at least approximately in line with one another in a direction parallel to the axis A. The aperture 4a' should preferably emerge in the wake of the upstream bluff body at least approximately centrally in front of the downstream bluff body, and the aperture 4b' should emerge in the wake of the downstream bluff body. The maximum cross-sectional area of the upstream bluff body taken on a plane perpendicular to the direction of fluid flow is preferably less than ¼ the maximum cross-sectional area of the downstream bluff body, also taken on a plane perpendicular to the direction of fluid flow.

In the present embodiment the upstream bluff body 6a is made from a ninety degree cone with a base diameter of 1/12 of the conduit internal diameter and the downstream bluff body 6b is also made from a ninety degree cone but with a base diameter of ¼ of the conduit internal diameter. The bluff bodies 6a and 6b can be made of any suitable solid material such as steel, ceramic or rubber and are attached to the sampling tubes 4a and 4b by standard weld, adhesive or threaded techniques. As seen in FIG. 4, the DPV generator 4 can be positioned inside the conduit 13 by making a hole in the conduit, attaching a coupling 19 to the outside of the conduit around the hole and attaching a plug 21 to hold the sampling tubes 4a and 4b in the correct orientation and location. This arrangement is shown in more detail in FIG. 4B.

Figure 4B:
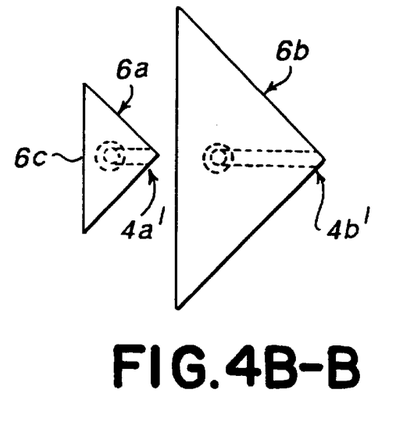
FIG. 4B is a side view of the DPV generator and installation interface and including sintered metal filters.

As is also shown in FIG. 4B, filters 7 can be inserted into the apertures 4a' and 4b' to prevent particulate building up and plugging the sampling tubes 4a and 4b. These filters can be manufactured from sintered metal, such as 40 micron spherical particles of metal such as bronze or steel, which are partially melted and stuck together under compression in a mould to form a porous structure which acts as a filter for particles above 5 micron. Typically the filters are cylindrical or disc shaped with a diameter and length of approximately 6 mm, but any shape can be used provided it forms a seal at the aperture and does not significantly change the overall external shape of the bluff body.

The filters 7 may be manufactured as homogeneous bodies, such as from 40 micron sintered metal particles as referred to above, or they can be made of two parts. In such case the main body 7a of the filter is made from relatively large spherical particles, e.g. of from 150 to 1000 microns, This part is very porous but provides the supporting structure of the filter. The second part is a thin layer 7b, typically of the order of 400 to 1000 microns thick, made from smaller spherical particles, such as 40 micron particles, and is much less porous. This layer acts as the filtering medium to prevent small particulate from entering the apertures 4a' and 4b'. The filters can be fastened in their correct position by standard physical attachment, adhesive or a threaded techniques.

Figure 4C:
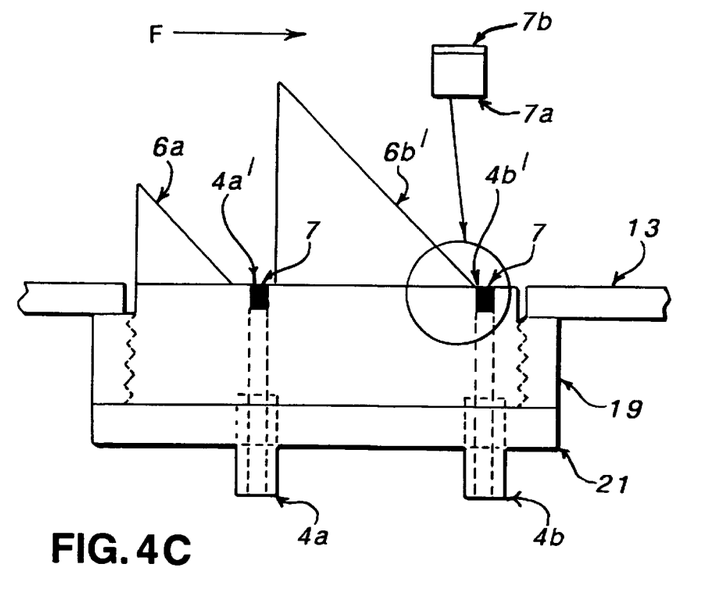
FIG.4C is a side view of an alternative construction of the DPV generator and installation interface.

An alternative arrangement for the DPV generator 4 is shown in FIG. 4C. Here the bluff bodies 6a' and 6b' are mounted on the inside of the plug 21 at least approximately in line with one another along the internal surface of the conduit 13. In the case of FIG. 4C the upstream bluff body 6a' is made from a ½ ninety degree cone with a diameter of 1/12 of the conduit diameter whereas the downstream bluff body 6b' is made from a ½ ninety degree cone but with a diameter of ¼ of the conduit diameter.

The internal cavity of the tubes 4a and 4b is continued through the plug 21 to the apertures 4a' and 4b' located just in front of the apexes of the bodies 6a' and 6b' respectively. The bluff bodies 6a' and 6b' can be made of any suitable solid material such as steel or ceramic and are attached to the plug 21 by standard physical attachment such as welded, adhesive or threaded techniques or they can be an integral part of the plug.

As before, bluff bodies of other regular or irregular shapes can be used, provided each body creates a wake providing a change in pressure and the bodies are at least approximately in line with one another in a direction parallel to the axis A. Again, the aperture 4a' should preferably emerge in the wake of the upstream bluff body at least approximately centrally in front of the downstream bluff body, and the aperture 4b' should emerge in the wake of the downstream bluff body. The maximum cross-sectional area of the upstream bluff body taken on a plane perpendicular to the direction of fluid flow is preferably less than ¼ the maximum cross-sectional area of the downstream bluff body, also taken on a plane perpendicular to the direction of fluid flow.

As is well known, at any point in the conduit 13 the total pressure is equal to the sum of the velocity pressure and the static pressure. Thus the aperture 4a' upstream of the second bluff body 6b is generally exposed to the total pressure at the point concerned, so that the pressure inside the tube 4a will be largely determined by the total pressure.

However, the aperture 4b' facing downstream is largely shielded from the flow of the fluid and accordingly the pressure inside the tube 4b will be largely determined by the static pressure. Hence the difference between the pressures in the tubes 4a and 4b is a measure of the velocity pressure which is in turn a function of the velocity of the pulverised coal in the conduit 13, as will be described.

The ends of the tubes 4a and 4b outside the conduit 13 are connected to respective 3-way valves 30, and the difference between the pressures in the two tubes 4a and 4b is measured by a differential pressure sensor or transducer (DPT)

9a connected across respective outputs 60 of the two valves 30 as shown in FIG. 4. The DPT 9a, which provides an electrical output signal which is a function of the difference between the pressures in the tubes, may be of a type marketed by Furness Controls Ltd., England. Normally, in order to monitor the flow of coal dust and air through the conduit 13 the input to each valve 30 is connected to the output 60. However, the pair of outputs 40 of the 3-way valves 30 permit air to be blown back into the conduit from time to time to ensure that the apertures 4a' and 4b' inside he conduit remain open and that the coefficient of the DPV generator does not change. This provision is particularly advantageous when the generator is used in situ for long term continuous monitoring. The pair of outputs 50 of the 3-way valves can be used to check zero to span calibration of the DPT 9a by applying a known pressure.

Figure 4D:
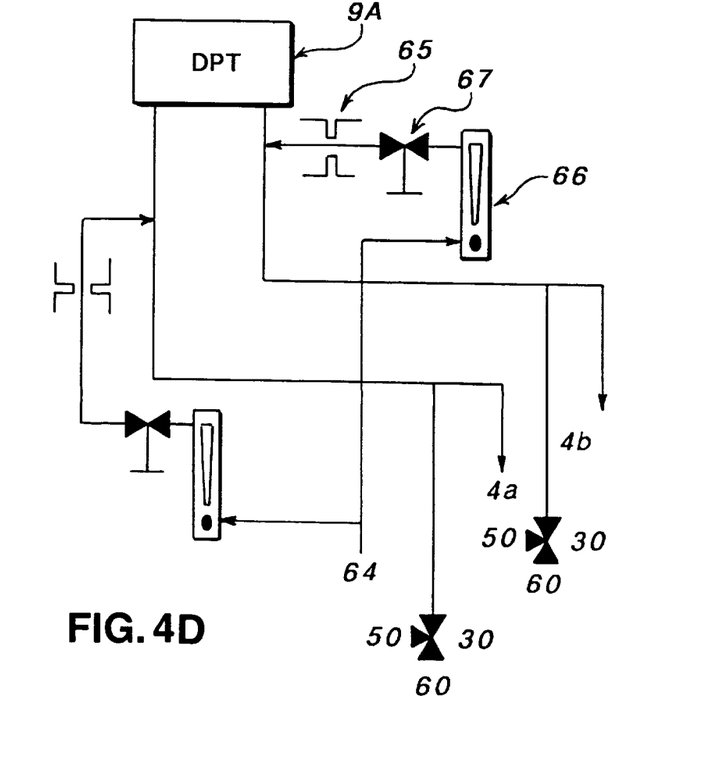
FIG. 4D shows a schematic of an alternative purge system for the DPV generator.

Further apparatus can be provided to prevent choking or build-up of particulate in or around the pressure measuring apertures 4a', 4b' in front of the DPT 9a, FIG. 4D. A suitable fluid, such as air, is bled from a supply 64 trough a respective orifice 65, approximately 0.1 mm in diameter, via a flow control device 66, such as a rotameter, and a suitable flow control valve 67. This provides a constant purging action while maintaining a pressure, for example, 25 kPa, on the valve 67 side of the orifice 65. The pressure in each tube 4a, 4b is set so that the net effect on the DPT 9a is zero, while preventing choking or build-up of particulate. This purging feature can also be applied to He apertures of the DPS generator. The DPV generator 4 can be inserted into and retracted from the conduit 13 while the system is in operation through a coupling 19 and a plug assembly 21 of generally conventional construction.

The mass flow of tie substance (pulverised coal) is determined by measuring the pressure difference between a pair of spaced locations along each conduit 13. The pressure difference measured may be the difference in total pressure or the difference in static pressure. For this measurement two apertures 5 are used, referred to herein as DPS generators, each at a respective one of the pair of spaced locations. The two DPS apertures may be located:

across a change in direction or acceleration or deceleration in the combined mass flow, for example across elbow 1 (FIG. 3a), after an asymmetric venturi 2a (FIG. 3e) or after an asymmetric orifice plate 2b (FIG. 3f), along a length of pipe where a sufficiently large differential pressure exists from the friction of the combined mass flow, for example a horizontal section 3 (FIG. 3b), where there is a change in elevation, for example a vertical section 8 (FIG. 3c), or a combination of the foregoing (FIG. 3d).

The DPS generator 5 may be of conventional design and in the simplest case the static pressure at each location is simply sampled trough a small aperture in the sidewall of the conduit 13 and fed to a respective inlet of a further DPT 9b of the aforementioned type marketed by Furness Controls Ltd. The signal provided by the differential pressure transducer 9b is referred to as the DPS signal. As in the case of the DPV generator, filters can also be installed in the apertures of the DPS generators to prevent blockage, and/or the blow back technique shown in FIG. 4D can be used.

The output signals DPV and DPS from the differential pressure transducers 9a and 9b respectively are inputs to a programmable logic controller (PLC) or data acquisition system 10.

To determine the velocity of the transport medium (air) 10, the generator 4 ought to be calibrated in a suitable wind tunnel to determine the correction factor, Kp, to enable the differential pressure signal DPV to be translated into an absolute velocity measurement in meters/sec:

$$V=Kp\times(DPV)^{0.5}$$

As the differential pressure is measured by the generator 4 substantially at a single point, the generator should be positioned at a location where the velocity V closely represents the average velocity Vavg. This may not always be possible. Alternatively, several generators can be installed at different points at the same location in the conduit, as a group. Their respective ends can be connected together outside the conduit, so that a single measurement will represent an average of all of the points, as opposed to a single point. Regardless, V should be checked and corrected with a correction factor Kc to accurately represent the average velocity:

$$Vavg=Kc\times V$$

The correction factor Kc is determined by comparing the square root of the pressure at this single point with the average of the square root of the pressures from a traverse of the conduit. This procedure must be performed without the substance being conveyed, If the correction factor Kc cannot be determined, the generator can be inserted into the centre of the conduit and the value of Kc can be assumed to be 0.95. Alternatively, the tip of the generator can be inserted into a location ¼ way between the wall and the centre of the conduit. In this case the value of Kc can be assumed to be 1.00.

Thus, having previously determined Kp and Kc, the PLC 10 is able to calculate the average velocity of the transport medium 10.

From this, the mass flow Qv rate of the transport medium is determined by the PLC 10 by multiplying the average velocity Vavg by the density Dv of the transport medium and by the cross sectional area A of the conduit 13 being monitored:

$$Qv=Dv\times A\times Vavg$$

To determine the mass flow rate of the conveyed substance (pulverised coal) the ratio RLC of the differential pressure signal DPS to the differential pressure signal DPV is determined when there is no substance being conveyed. This ratio is referred to as the loss coefficient and is used as a reference ratio:

$$RLC=DPS/DPV \text{ (no substance being conveyed)}$$

Then, with the system operational, the PLC 10 determines the ratio RS of the differential pressure signals DPS and DPV while the substance is being conveyed:

$$RS=DPS/DPV \text{ (with substance being conveyed)}$$

and compares His ratio to the ratio RLC to determine a value PS:

$$PS=RS/RLC$$

Figure 5:
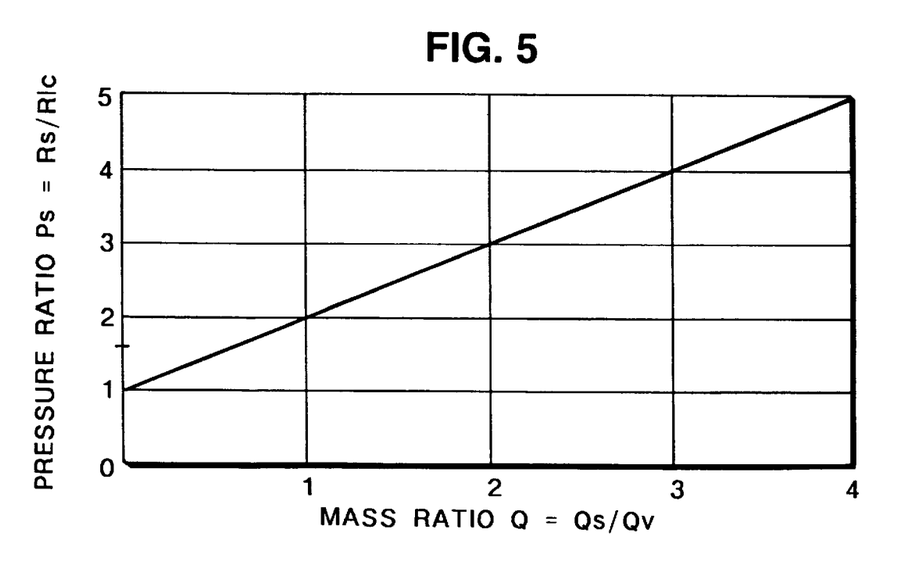
FIG. 5 is a graph illustrating how the mass flow rate of the pulverised coal can be calculated.

The magnitude of PS is used by the PLC 10 to determine the mass flow ratio Q from the relationship shown graphically in FIG. 5. Then, the mass flow rate of the substance being conveyed Qs can be easily determined from the mass flow ratio Q and the mass flow rate Qv of the transport medium:

$$Qs=Qv\times Q$$

As mentioned above, these calculations are performed by the PLC 10, although a data acquisition system (essentially a sample and hold circuit and an analog to digital converter) and a suitably programmed personal computer can alternatively be used. The mass flow rate of the substance being conveyed can be determined automatically and continuously from the typical relationship shown on FIG. 5.

It will be understood that FIG. 5 assumes an ideal linear relationship. In practice the ratio of PS to Q may not be linear, but in all cases the relationship can be determined by an initial calibration of the system using known flow rates. Then, a compensating algorithm may be used to provide the correct relationship, or corresponding values of PS and Q can be loaded in a look-up table accessed by the PLC 10.

Thus for each conduit 13 the PLC 10 can compute the massflow rate of the transport medium 10 (air) and the mass flow rate of the substance 11 (pulverised coal) being conveyed. Further, the PLC 10 can determine the relative distribution of the transport medium between the conduits, the relative distribution of the particulate being conveyed, and the relative distribution of the ratio of the mass flow rate of transport medium to te substance being conveyed.

In other words, in the system of FIG. 2 where pulverised coal is transported by primary air, the PLC 10 can determine the primary air mass flow rate, the coal mass flow rate, and the, air to coal ratios in each of the conduits 13.

The PLC 10 can also determine the maximum/minimum values of the mass flow rates and mass flow ratios respectively. Furthermore, the coefficients of variability of the mass flow ratios can also be provided to indicate the transient quality of the mixture.

The PLC 10 together with the differential pressure generators 4, 5 and the differential pressure sensors 9a and 9b thus constitute a monitoring system which can be used to provide electrical feedback signals to the process management system to indicate low flow (i.e. potential for pluggage or fire in the conduits), no flow (i.e. pluggage), and high flow (i.e. potential for high erosion or extinguishing the propagation of the flame front) but most importantly the distribution of primary air 10 and pulverized coal 11 through the conduit 13 to the burners in the furnace 14. Such feedback signals can then be used to make manual or automatic adjustments to the mass flows to the distribution of the mass flows and the ratio of the mass of the transport medium to the substance being conveyed along each of the conduits.

Further, the information provided by the monitoring system on the mass flow rate distributions in the conduits can be used to select or corroborate the size of reduced diameter sections 15 of pipe (FIG. 2) or fixed orifice plates 16 and verify that the desired distribution has been achieved in a on-line continuous manner.

The monitoring system can provide automatic electrical feedback control signals to allow for on-line adjustment to manual gate valves 23 or motorised gate valves 24 driven pneumatically, hydraulically or electrically. Similarly, these feedback signals could be used to adjust internal rifflers or deflectors at or near the junction where the common conduits split into two or more single conduits to each of the burners. Restrictions to achieve the desired balance in the conduits 13 can also be provided by permanently installed orifice plates 16 or reduced diameter sections 15 of burner lines or pipes. These adjustments to the various mass flow rates can be made to obtain the desired mass flow quantities of the transport medium and the substance being transported in the respective conduits.

Adjustments to the mass flow rates can also be made by injecting additional transport medium 25 at the inlet into the conduits as they exit the common supply vessel 12, which has the effect of diluting the concentration of the mixture.

Alternatively or additionally, the supply of secondary air 17 directly into the furnace 14 adjacent the outlet end of each conduit 13 can be controlled by feedback from the monitoring system. Normally, the supply of secondary air 17 is controlled by a control system 80 which adjusts a damper 70 in dependence upon a pressure difference 90. In response to feedback signals from the PLC 10 the control system 80 can adjust the mass flow rate of the secondary air to the flow of coal at the corresponding point. The control system can also provide a feedback signal to the process management system to indicate the rate of change of mass flow of substance being conveyed. This can provide a fine adjustment to changes to the heat input into a furnace which can minimise the typical swings to the main steam pressure that can occur with currently available control logic systems.

Furthermore, the control system can also provide a means to control the distribution of the substance being conveyed, i.e. the heat input being injected into the various parts of the furnace. This can provide the ability to continuously monitor and control the optimum arrangement and configuration for combustion and thus minimise the excess air requirements as well as the level of carbon in ash, CO and the emissions of NOx from a furnace.

Although the monitoring system described above is used in connection with solid particulate matter in a gaseous transport medium, it can provide in-situ on-line measurements either continuously or discretely in other two-phase applications such as solid particulate matter in a liquid transport medium, a liquid in a gaseous transport medium, and a relatively heavier density liquid in a relatively lighter density liquid.

Further, the system applies to both a single conduit or to a multiple conduit configuration. In the multiple conduit configuration the conduits may be of different diameters, arrangement and lengths, and the mass flow rates in the multiple conduits can be measured sequentially or simultaneously.

The invention is not limited to the embodiments described herein which may be modified or varied without departing from the scope of the invention.

I claim:

1. An apparatus for measuring the velocity of a fluid flowing in a conduit, comprising a differential pressure generator including first and second bluff bodies which are positioned in the conduit to create a differential pressure that is a function of the velocity of the fluid, first and second pressure sampling apertures which are located downstream of the first and second bluff bodies respectively, and a differential pressure sensor for providing an electrical signal which is a function of the difference between the pressures at the apertures, wherein the first and second bluff bodies are located in a substantially constant cross-section portion of the conduit with the first bluff body immediately upstream of and at least approximately in line with the second bluff body in a direction parallel to the axis of the conduit, and wherein the maximum cross-sectional area of the first bluff body taken on a plane perpendicular to the axis of the conduit is substantially less than the maximum cross-sectional area of the second bluff body.

2. An apparatus as claimed in claim 1, wherein the first pressure sampling aperture emerges in the wake of the first bluff body at least approximately centrally in front of the second bluff body, and the second pressure sampling aperture emerges in the wake of the downstream bluff body.

3. An apparatus as claimed in claim 1, wherein the maximum cross-sectional area of the first bluff body taken on a plane perpendicular to the axis of the conduit is less than ¼ the maximum cross-sectional area of the second bluff body.

4. An apparatus as claimed in claim 1, wherein the bluff bodies are supported away from the internal surface of the conduit by respective tubes extending from a side of the conduit, the tubes communicating through the respective bodies with the first and second pressure sampling apertures and serving to transmit the sampled pressures to the differential pressure sensor.

5. An apparatus as claimed in claim 4, wherein tile bluff bodies comprise respective cones arranged at least approximately on a common axes parallel to the axis of the conduit and having broad upstream-facing surfaces arranged at least approximately normal to the axis of the conduit.

6. An apparatus as claimed in claim 5, wherein the first bluff body comprises a ninety degree cone with a base diameter of approximately ¹⁄₁₂ of the conduit internal diameter and the second bluff body comprises a ninety degree cone with a base diameter of approximately ¼ of the conduit internal diameter.

7. An apparatus as claimed in claims 1, wherein the bluff bodies are mounted along the internal surface of the conduit.

8. An apparatus as claimed in claim 7, wherein the bluff bodies comprise respective half-cones arranged at least approximately on a common axis parallel to the axis of the conduit and having broad upstream-facing surfaces arranged at least approximately normal to the axis of the conduit.

9. An apparatus as claimed in claim 8, wherein the first bluff body comprises a half ninety degree cone with a base diameter of approximately ¹⁄₁₂ of the conduit internal diameter and the second bluff body comprises a half ninety degree cone with a base diameter of approximately ¼ of the conduit internal diameter.

10. A system for monitoring and controlling an arrangement in which a particulate material is transported through a conduit entrained in a fluid, the system comprising a first apparatus and a second apparatus, the first apparatus comprising a differential pressure generator including first and second bluff bodies which are positioned in the conduit to create a differential pressure that is a function of the velocity of the fluid, first and second pressure sampling apertures which are located downstream of the first and second bluff bodies respectively and a differential pressure sensor for providing an electrical signal which is a function of the difference between the pressures at the apertures, wherein the first and second bluff bodies are located in a substantially constant cross-section portion of the conduit with the first bluff body immediately upstream of and at least approximately in line with the second bluff body in a direction parallel to the axis of the conduit, and wherein the maximum cross-sectional area of the first bluff body taken on a plane perpendicular to the axis of the conduit is substantially less than the maximum cross-sectional area of the second bluff body, the first apparatus being positioned relative to the conduit such that the bluff bodies are located in a region of the conduit at least generally free of particulate material, and the second apparatus comprising means for producing a further electrical signal which is a function of the difference between the pressures at relatively widely spaced locations along the conduit, the system further including means for automatically controlling at least one flow parameter as a function of the first and further electrical signals.

* * * * *

UNITED STATES PATENT AND TRADEMARK OFFICE
CERTIFICATE OF CORRECTION

PATENT NO.  : 5,908,990
DATED       : June 1, 1999
INVENTOR(S) : Derek Philip Cummings It is certified that error appears in the above-indentified patent and that said Letters Patent is hereby corrected as shown below:

Col. 2, line 20, "Me" should be --the--

Col. 2, line 36, "in" is the beginning of a sentence and should start with a capital --In--

Col. 5, line 33, "tie" should be --the--

Col. 5, line 53, "trough" should be --through--

Col. 6, line 56, "His" should be --this--

Col. 7, line 22, "te" should be --the--.

Signed and Sealed this

Second Day of November, 1999

Attest:

Attesting Officer

Q. TODD DICKINSON

Acting Commissioner of Patents and Trademarks